United States Patent
Czerny et al.

(10) Patent No.: US 7,448,468 B2
(45) Date of Patent: Nov. 11, 2008

(54) ACOUSTICALLY EFFECTIVE WHEEL HOUSE COVERING FOR VEHICLES

(75) Inventors: Hans Rudolf Czerny, Swisttal (DE); Christian Gnädig, Mechernich (DE); Herbert Vollmert, Nettetal (DE); Albert Kallenberg, Hürth (DE)

(73) Assignee: Carcoustics Tech Center GmbH, Leverkusen (DE)

( * ) Notice: Subject to any disclaimer, the term of this patent is extended or adjusted under 35 U.S.C. 154(b) by 0 days.

(21) Appl. No.: 10/545,541

(22) PCT Filed: Apr. 13, 2004

(86) PCT No.: PCT/EP2004/003876

§ 371 (c)(1),
(2), (4) Date: Aug. 12, 2005

(87) PCT Pub. No.: WO2005/007458

PCT Pub. Date: Jan. 27, 2005

(65) Prior Publication Data

US 2006/0144627 A1    Jul. 6, 2006

(30) Foreign Application Priority Data

Jul. 15, 2003   (DE) ................... 103 32 172

(51) Int. Cl.
*B64F 1/26* (2006.01)
(52) U.S. Cl. .................................. 181/210
(58) Field of Classification Search ........... 181/210, 181/204, 207; 296/39.3, 198; 180/69.22, 180/69.23; 280/770
See application file for complete search history.

(56) References Cited

U.S. PATENT DOCUMENTS 1,230,381 A * 6/1917 Comerma .............. 106/674
1,704,048 A * 3/1929 Jordan .................. 280/847
1,804,895 A * 5/1931 Stephenson .......... 442/323

(Continued)

FOREIGN PATENT DOCUMENTS

DE    198 17 567 A1    11/1999

(Continued)

*Primary Examiner*—Lincoln Donovan
*Assistant Examiner*—Forrest Phillips
(74) *Attorney, Agent, or Firm*—Collard & Roe, P.C.

(57) ABSTRACT

The invention relates to an acoustically effective wheel house covering for vehicles, i.e. a wheel house covering which can reduce transmission of splash water noises in the passenger compartment of the vehicle and which can absorb the sound of rolling tires on a roadway, which wheel house covering comprises several layers of material. In order to improve the sound-absorbing effect of such wheel house coverings, it is proposed that the wheel house covering is formed of at least three air-permeable sandwiched layers of material (6, 9, 10) comprising a first textile material layer (6) facing the wheel housing, with the air permeability of said first textile material layer at a test pressure of 1 mbar ranging from 15 to 60 $l/m^2s$, and with the air permeability of a second textile material layer (10) arranged between the first (6) and third (9) material layers at a test pressure of 1 mbar ranging from 100 to 1500 $l/m^2s$, wherein the third material layer (9) is a textile material layer facing the tire, with the air permeability of said third material layer at a test pressure of 1 mbar ranging from 20 to 200 $l/m^2s$.

19 Claims, 1 Drawing Sheet

U.S. PATENT DOCUMENTS

Figure 1:
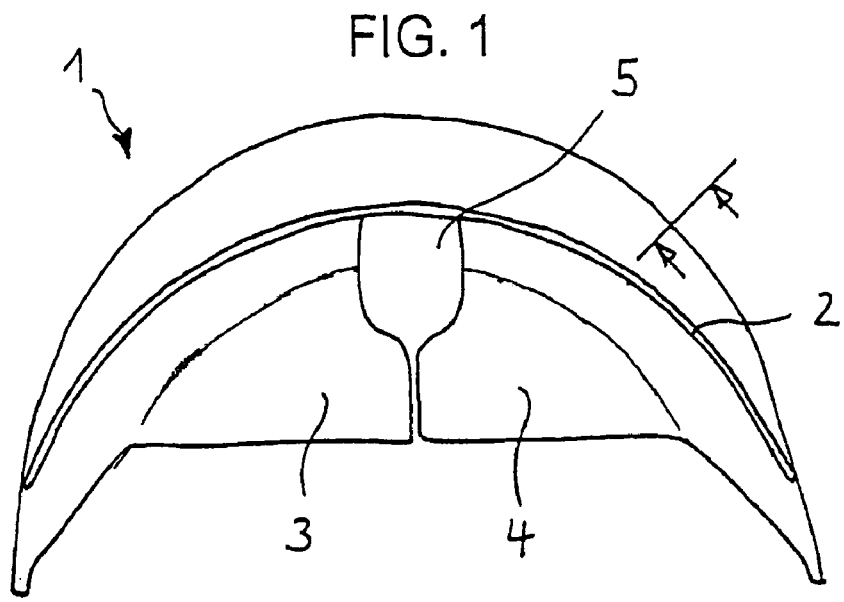

| | | | | |
|---|---|---|---|---|
| 2,278,733 | A * | 4/1942 | Peik | 181/290 |
| 2,542,428 | A * | 2/1951 | Peik | 181/290 |
| 3,061,491 | A * | 10/1962 | Sherrard et al. | 428/216 |
| 3,822,864 | A * | 7/1974 | Val | 181/286 |
| 3,823,794 | A * | 7/1974 | Bre | 181/286 |
| 4,111,081 | A * | 9/1978 | Hilliard et al. | 181/290 |
| 4,735,427 | A * | 4/1988 | Fuchs | 280/847 |
| 4,923,034 | A * | 5/1990 | Okuzawa et al. | 181/207 |
| 5,088,576 | A * | 2/1992 | Potthoff et al. | 181/290 |
| 5,094,318 | A * | 3/1992 | Maeda et al. | 181/290 |
| 5,196,253 | A * | 3/1993 | Mueller et al. | 428/138 |
| 5,280,960 | A * | 1/1994 | Casey | 280/848 |
| 5,493,081 | A * | 2/1996 | Manigold | 181/286 |
| 5,550,338 | A * | 8/1996 | Hielscher | 181/290 |
| 5,631,451 | A * | 5/1997 | Torisaka et al. | 181/207 |
| 5,681,072 | A * | 10/1997 | Stricker | 296/39.3 |
| 5,767,024 | A * | 6/1998 | Anderson et al. | 442/378 |
| 5,839,761 | A * | 11/1998 | Dodt | 280/851 |
| 5,965,851 | A * | 10/1999 | Herreman et al. | 181/200 |
| 5,976,646 | A * | 11/1999 | Stevens et al. | 428/31 |
| 5,996,730 | A * | 12/1999 | Pirchl | 181/211 |
| 6,086,104 | A * | 7/2000 | Marchisio et al. | 280/851 |
| 6,152,259 | A * | 11/2000 | Freist et al. | 181/290 |
| 6,155,624 | A * | 12/2000 | Bienenstein, Jr. | 296/37.1 |
| 6,302,466 | B1 * | 10/2001 | Zwick | 296/39.3 |
| 6,336,677 | B2 * | 1/2002 | Scott | 296/198 |
| 6,641,194 | B2 * | 11/2003 | Fujii et al. | 296/39.3 |
| 6,713,150 | B2 * | 3/2004 | Alts et al. | 428/73 |
| 6,953,205 | B2 * | 10/2005 | Friest et al. | 280/770 |
| 7,201,253 | B2 * | 4/2007 | Duval et al. | 181/204 |
| 2002/0060451 | A1 * | 5/2002 | Lambertus | 280/770 |
| 2002/0134616 | A1 * | 9/2002 | Sheperd | 181/290 |
| 2003/0011183 | A1 * | 1/2003 | Freist et al. | 280/770 |
| 2003/0062738 | A1 * | 4/2003 | Fujii et al. | 296/39.3 |
| 2003/0220034 | A1 * | 11/2003 | Ochs | 442/76 |
| 2004/0080185 | A1 * | 4/2004 | Loddo | 296/198 |
| 2004/0231915 | A1 * | 11/2004 | Thompson et al. | 181/290 |
| 2006/0124387 | A1 * | 6/2006 | Berbner et al. | 181/290 |
| 2006/0151222 | A1 * | 7/2006 | Tinti | 180/69.22 |
| 2006/0214474 | A1 * | 9/2006 | Omiya et al. | 296/198 |
| 2007/0137927 | A1 * | 6/2007 | Ducharme | 181/294 |

FOREIGN PATENT DOCUMENTS

| | | |
|---|---|---|
| DE | 199 30 762 A1 | 12/1999 |
| EP | 0 222 193 A | 5/1987 |
| EP | 0 810 145 A | 12/1997 |
| WO | WO 01/58722 | 1/2001 |

\* cited by examiner

ACOUSTICALLY EFFECTIVE WHEEL HOUSE COVERING FOR VEHICLES

CROSS REFERENCE TO RELATED APPLICATIONS

Applicants claim priority under 35 U.S.C. §119 of German Application No. 103 32 172.1 filed on Jul. 15, 2003. Applicants also claim priority under 35 U.S.C. §365 of PCT/EP2004/003876 filed on Apr. 13, 2004. The international application under PCT article 21(2) was not published in English.

The invention relates to an acoustically effective wheel house covering for vehicles, i.e. a wheel house covering which can reduce transmission of splash water noises in the passenger compartment of the vehicle and which can absorb noises caused by the rolling of a tyre on a roadway, which wheel house covering comprises several layers of material and is attachable to a wheel housing of the vehicle.

Such wheel house coverings are known. For example EP 0 222 193 B1 describes a wheel house covering for motor vehicles, which wheel house covering comprises a shell made of plastic material, which shell matches the contour of the wheel housing and is attached to the wheel housing, wherein the plastic material that forms the shell is a needled plastic fibre non-woven material which is made from a web material that has been matched to the contour of the wheel housing by hot forming, and is attached to the wheel housing by means of adhesive bonding, clamping, screwing or the like. In one embodiment of this known wheel house covering, the back of the plastic fibre non-woven material has been made impermeable to water by means of a plastic layer and has been attached over its entire area to the wheel housing. In another embodiment both the front and the back of the plastic fibre non-woven material have been made impermeable to water by means of a plastic layer.

However, the plastic layer is associated with a disadvantage in that it reduces the sound-absorbing effect (dissipation effect) of the wheel house covering.

From DE 198 17 567 C2 a wheel house shell for vehicles is known which comprises first and second surface regions, wherein the first surface regions form a supportive skeleton and consist of an acoustically effective thermoplastic plastic material, while the second surface regions are formed of a textile plastic material with a surface in the manner of carpet pile. At the margin, the two surface regions are firmly interconnected, and extend without significant overlap across the entire thickness of the wheel house shell. The second surface regions at least in some places of their sides facing the wheel housing comprise a waterproof plastic coating. This plastic coating, too, leads to a reduction in the sound-absorbing effect.

Furthermore, from DE 199 30 762 A1 a shell-like wheel house covering for motor vehicles is known which consists of a light frame structure, made from plastic, which at least at its side facing the wheel is covered by a tear resistant and impact resistant plastic film. The frame structure comprises two lateral strips and several connection strips which hold said lateral strips together at a distance, wherein the lateral strips and connection strips delimit apertures or hollow spaces which are covered by the above-mentioned plastic film. However, the sound absorption capacity of this wheel house covering is rather unsatisfactory because the plastic film attached to the frame structure acts like the tight skin of a drum, thus causing irritating splash water noises when being hit by splash water.

Starting from this state of the art, it is the object of the present invention to create a wheel house covering for vehicles which has an improved sound absorbing effect.

In a wheel house covering of the type mentioned in the introduction, according to the invention this object is met in that the layers of material of said wheel house covering are formed of at least three air-permeable sandwiched layers of material, with the air permeability of a first textile material layer which faces the wheel housing at a test pressure of 1 mbar ranging from 15 to 60 $l/m^2s$, and with the air permeability of a second textile material layer arranged between the first and third material layers at a test pressure of 1 mbar ranging from 100 to 1500 $l/m^2s$, wherein the third material layer is a textile material layer facing the tyre, with the air permeability of said third material layer at a test pressure of 1 mbar ranging from 20 to 200 $l/m^2s$.

The wheel house covering according to the invention features an improved sound-absorbing effect. It has both a sound-absorbent and a sound insulating effect. Its material layers are each air-permeable so that the sound absorption capacity of the wheel house covering is high when compared to that of conventional wheel house coverings. The material layers of the wheel house covering according to the invention have been selected or treated in such a way that the air permeability differs from layer to layer. Accordingly, in relation to the acoustic impedance, there are thus impedance steps at the transitions between the material layers, which impedance steps result in improved sound absorption and sound insulation.

The stated values for air permeability of the material layers of the wheel house covering according to the invention have been determined according to DIN 53887. This standard defines a test method for assessing the air permeability of textile fabrics. In this test method, a sample of the textile fabric to be tested is tensioned in a sample ring, and a certain test pressure is applied so that air flows through the test sample, perpendicularly to the surface of said test sample. The test area measures 20 $cm^2$. The resistance of the test sample causes a pressure loss so that a pressure difference arises. The volume flow which flows through the test sample is determined in relation to the test area. The measured values determined are stated in $l/m^2s$.

A preferred embodiment of the wheel house covering according to the invention consists of at least the second material layer comprising a compliant elastic structure. The elastic structure considerably reduces the noises generated by the impact of splash water, stones or the like on the wheel house covering.

A further advantageous embodiment of the wheel house covering according to the invention provides for its second material layer to comprise natural fibres connected by binding agent, in particular comprising coconut fibres. Coconut fibres are an economical and reproductive raw material. They have long wearing properties and are very durable in humid environments, in particular when exposed to splash water. Preferably, coconut fibres are formed with latex to form an air-permeable mat or an air-permeable formed part, for example by means of a form press. Such coconut fibre mats or coconut fibre formed parts feature considerable elasticity and high strength, in particular considerable impact resistance. Furthermore, it is advantageous that normally there is no fungus formation in mats or formed parts made of coconut fibres, as can be the case in other natural fibres exposed to humidity.

Another advantageous embodiment of the wheel house covering according to the invention results when its second material layer is formed by granulated cork connected by a binder. In particular, glues or impregnating resins can be used as binders. Cork is relatively light. The wheel house covering can thus be of a corresponding lightweight design. Furthermore, cork has relatively high elasticity and an outstanding insulation effect. The granulated cork used in this embodiment comprises cork particles of an average grain size preferably ranging from 1 to 5 mm. Granulated cork of such a grain size gives the second material layer a high porosity and a correspondingly high sound-absorbing effect.

A further advantageous embodiment of the wheel house covering according to the invention results when its second material layer is made of a voluminous non-woven fabric of a layer thickness ranging from 3 to 15 mm, preferably approximately 4 to 10 mm. The voluminous non-woven material is also compliant and elastic. Furthermore, it has a good sound-absorbing effect while being particularly light in weight.

Furthermore, it is advantageous if at least the material layer of the wheel house covering, which material layer faces the tyre, is of hydrophobic design. In this way water absorption by the wheel house covering can be reduced to a minimum.

Further preferred and advantageous embodiments of the invention are stated in the subordinate claims.

Figure 2:
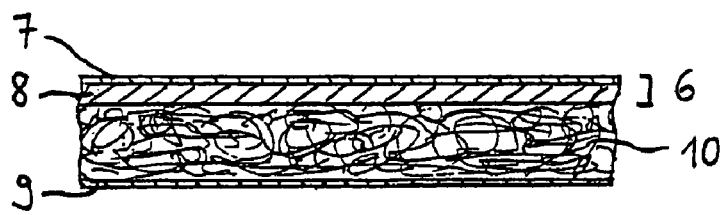
Figure 3:
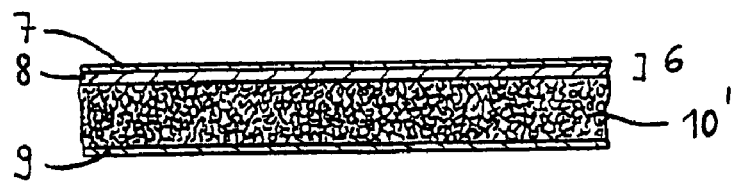
Figure 4:
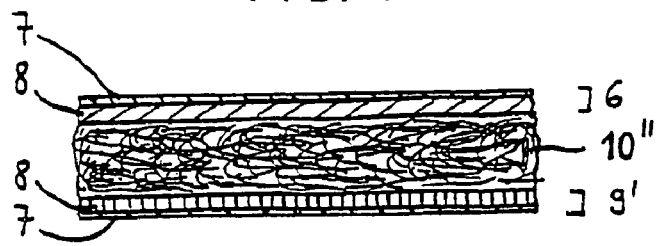

Below, the invention is explained in more detail with reference to a drawing showing several exemplary embodiments. The following are diagrammatically shown:

FIG. 1 a perspective view of a wheel house covering according to the invention;

FIG. 2 a sectional view of a section of a wheel house covering according to the invention, according to a first embodiment;

FIG. 3 a sectional view of a section of a wheel house covering according to the invention, according to a second embodiment; and FIG. 4 a sectional view of a section of a wheel house covering according to the invention, according to a third embodiment.

FIG. 1 shows a shell-shaped wheel house covering 1 for a front wheel housing of a motor vehicle body. The wheel house covering 1 largely follows the contour of a wheel housing made from sheet metal, wherein said wheel house covering 1 can be attached to the wheel housing by means of fasteners such as screws, clips or the like. Furthermore, the wheel house covering 1 comprises clamping rims 2 for its attachment. At its side facing the engine of the motor vehicle, the wheel house covering 1 comprises two side covers 3, 4 which are preferably formed in one piece with the wheel house covering 1. Between the side covers 3, 4 there is a recess 5 for a steering linkage of the motor vehicle.

The wheel house covering 1 shown in FIG. 1 comprises several layers. It is constituted of at least three air-permeable sandwiched layers of material, each comprising a defined air permeability or a defined sound impedance (flow resistance). The material layers have been selected and/or treated or finished in such a way that they have different air permeability and thus different sound impedance with respect to each other. The material layer facing the wheel housing is a textile material layer whose air permeability according to DIN 53887 at a test pressure of 1 mbar ranges from 15 to 60 l/m²s. The material layer facing the tyre also consists of a textile material layer. At a test pressure of 1 mbar its air permeability ranges from 20 to 200 l/m²s. Between the two material layers another material layer with an air permeability ranging from 100 to 1500 l/m²s is arranged.

A preferred embodiment provides for the air permeability of the material layer 6 which faces the wheel housing to be less than that of the second material layer 10, and in turn for the air permeability of the second material layer 10 to be less than that of the third material layer 9.

The side covers 3, 4 are also made from several material layers wherein the air permeability of the material layer facing the engine is greater than that of an adjacent material layer. The side covers 3, 4 can in particular be made from more than two material layers, wherein the air permeability or the sound impedance of the material layers increases from the material layer that faces the engine towards the material layer facing the tyre.

FIG. 2 shows a first embodiment of the layer structure of the wheel house covering 1 according to the invention. The material layer 6 facing the wheel housing is air-permeable and made from a needle-punched non-woven material 7 and a carrier layer 8 that is resistant to bending. The needle-punched non-woven material 7 which faces the wheel housing can preferably be a non-woven material made from polyethyleneterephthalate fibres (PET). The carrier layer 8 is made from a mixture of polyethyleneterephthalate fibres (PET) and polypropylene fibres (PP). The mixture ratio is approximately 65 to 70 weight % PET to 30 to 35 weight % PP. The material layer 6 has a mass per unit area of approximately 0.9 to 1.4 kg/m² and a layer thickness of approximately 2 to 3 mm.

The material layer 9 facing the tyre or the roadway is also air permeable. It comprises a relatively thin covering needle-punched non-woven material made of polyester fibres. The covering needle-punched non-woven material has a mass per unit area of approximately 70 to 150 g/m². Preferably, the material layer 9 has been treated by a suitable impregnation means so as to be hydrophobic.

In this embodiment, the material layer 10 arranged between the material layers 6 and 9 is formed by an insert of coconut fibres bound with latex. The individual coconut fibres are largely enclosed by latex. In this arrangement the coconut fibres are compressed to such an extent that the air-permeability of the resulting air-permeable material layer 10 ranges from approximately 100 to 300 l/m²s (relative to a test pressure of 1 mbar). It can be seen that the material layer 10 is significantly thicker than the two other material layers 6 and 9. The material layer 10 is at least twice as thick as the material layer 6, which faces the wheel housing. The mass per unit area of the material layer 10 ranges from 1,000 to 2,000 g/m², preferably from 1,200 to 1,800 g/m². The sound impedance (flow resistance) of the material layer 6 is considerably higher than that of the middle material layer 10 made of coconut fibres and latex.

FIG. 3 shows a second embodiment of the layer structure of the wheel house covering 1 according to the invention. The layer structure differs from the layer structure according to FIG. 2 only in that the middle material layer 10' is formed by granulated cork connected by a binder. The average grain size of the cork particles which form the granulated cork range from approximately 1 to 5 mm. The middle material layer 10' has thus a high porosity. The granulated cork can be fixed to a textile carrier layer, preferably a transparent or air-permeable fabric made of natural fibres or artificial fibres. Adhesives or impregnating resins such as for example URE-COLL® or Aronal® from BASF AG can be used as binders for fixing the cork particles to each other and to the textile carrier layer. Here again, the sound impedance of the material layer 6 is considerably higher than that of the middle material layer 10' made of granulated cork and binder.

The layer structures shown in FIGS. 2 and 3 extend in particular to the side covers 3, 4 of the wheel house covering 1 according to FIG. 1. The material layers 6, 9 and 10 or 6, 9 and 10' preferably extend parallel in relation to each other around the entire circumference of the respective wheel house covering 1. However, a selective arrangement of the material layers 6, 9 and 10 or 6, 9 and 10' is possible, such that the sandwiched layer structure of these materials is for example limited to regions of the wheel house covering which are particularly exposed to splash water and/or to stone impact.

FIG. 4 shows a third embodiment of the layer structure of the wheel house covering according to the invention. The material layer 6, which faces the wheel housing, corresponds to the air-permeable material layer 6 made of needle-punched non-woven material and the carrier layer according to FIG. 2. In this embodiment, the material layer 9' also corresponds to the material layer 6 according to FIG. 2, except that the needle-punched non-woven material 7 faces the tyre or the roadway. At least the needle-punched non-woven material 7 has been treated so as to be hydrophobic and preferably also oleophobic.

Between the material layers 6, 9' or their carrier layers 8, which are resistant to bending, an insert made of a voluminous non-woven material 10" is arranged. The voluminous non-woven material consists of for example PET fibres, with its layer thickness ranging from approximately 3 to 10 mm, preferably 4 to 6 mm. The voluminous non-woven material 10" gives the sandwiched layer structure elastic properties. The material layers 6 and 9' have a considerably higher sound impedance, and thus a considerably lower air permeability than the middle material layer 10" made of voluminous non-woven material. The overall thickness of the layer structure shown in FIG. 4 ranges from approximately 7 to 10 mm, with the layer structure preferably being intended for wheel house coverings that are installed in the rear wheel housings of motor vehicle bodies.

The application of the invention is not limited to the exemplary embodiments described above. Instead, several variants are possible which, even if the design deviates in principle, make use of the inventive idea defined in the claims. For example, in the layer structure according to FIG. 4, the voluminous non-woven material which forms the middle material layer 10" can be replaced by the material layer 10 comprising coconut fibres and latex according to FIG. 2, or by the material layer 10' comprising granulated cork and binder according to FIG. 3. It is also within the scope of the invention to limit the arrangement of the air-permeable material layers 6, 9, 10; 6, 9, 10' or 6, 9', 10" to the region of the side covers 3, 4. The remaining part of the wheel house covering is then primarily used as a protection against stone impact and corrosion, and in this case is essentially made from a compact plastic material.

The invention claimed is:

1. A wheel house covering for vehicles, which reduces transmission of splash water noises in the passenger compartment of the vehicle and which absorbs noises caused by the rolling of a tire on a roadway, wherein said wheel house covering comprises:
    a plurality of material layers, wherein said plurality of material layers comprise at least three air-permeable sandwiched layers of material comprising a first textile material layer facing the wheel housing with the air permeability of the first textile material layer which faces the wheel housing at a test pressure of 1 mbar ranging from 15 to 60 l/m²s, and with the air permeability of a second textile material layer arranged between the first and third material layers at a test pressure of 1 mbar ranging from 100 to 1500 l/m²s, wherein the third material layer is a textile material layer facing the tire, with the air permeability of said third material layer at a test pressure of 1 mbar ranging from 20 to 200 l/m²s.

2. The wheel house covering according to claim 1, wherein the thickness of the second material layer is larger than that of the first material layer or that of the third material layer.

3. The wheel house covering according to claim 1, wherein at least the second material layer comprises an elastic structure.

4. The wheel house covering according to claim 1, wherein the second material layer is made from natural fibres connected by a binder.

5. The wheel house covering according to claim 1, wherein the second material layer is made from coconut fibres bound by latex.

6. The wheel house covering according to claim 1, wherein the second material layer is made from granulated cork connected by a binder.

7. The wheel house covering according to claim 1, wherein the second material layer is made from a voluminous non-woven fabric of a layer thickness ranging from 4 to 10 mm.

8. The wheel house covering according to claim 1, wherein the first material layer is made from a needle-punched non-woven material and a carrier layer resistant to bending.

9. The wheel house covering according to claim 1, wherein the third material layer is made from a needle-punched non-woven material and a carrier layer resistant to bending.

10. The wheel house covering according to claim 8, wherein the carrier layer is made from polyethyleneterephthalate fibres and polypropylene fibres.

11. The wheel house covering according to claim 8, wherein the needle-punched nonwoven material is arranged on the outside of the carrier layer.

12. The wheel house covering according to claim 1, wherein the sound impedance of the first material layer is higher than that of the second material layer.

13. The wheel house covering according to claim 1, wherein the sound impedance of the third material layer is higher than that of the second material layer.

14. The wheel house covering according to claim 1, wherein at least the third material layer is made so as to be hydrophobic or oleophobic.

15. The wheel house covering according to claim 1, wherein the air permeability of the first material layer is lower than that of the second material layer, and in that the air permeability of the second material layer is lower than that of the third material layer.

16. The wheel house covering according to claim 1, wherein in each case the air permeability of the first material layer and the third material layer is lower than that of the second material layer.

17. The wheel house covering according to claim 1, wherein at its side facing the engine of the motor vehicle, the wheel house covering comprises at least one side cover.

18. The wheel house covering according to claim 17, wherein the side cover is formed in one piece with the wheel house covering.

19. The wheel house covering according to claim 17, wherein the side cover is made from several material layers, wherein the air permeability of the material layer facing the engine is higher than that of a material layer arranged adjacent to said material layer facing the engine.

* * * * *